US012088042B2

(12) United States Patent
Kamemura

(10) Patent No.: US 12,088,042 B2
(45) Date of Patent: Sep. 10, 2024

(54) CONNECTOR WITH SUPPORTING MEMBER PRESSING RESILIENT PIECES AGAINST THE WIRE

(71) Applicant: SUMITOMO WIRING SYSTEMS, LTD., Mie (JP)

(72) Inventor: Masato Kamemura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 291 days.

(21) Appl. No.: 17/781,029

(22) PCT Filed: Nov. 18, 2020

(86) PCT No.: PCT/JP2020/042946

§ 371 (c)(1),
(2) Date: May 30, 2022

(87) PCT Pub. No.: WO2021/111875

PCT Pub. Date: Jun. 10, 2021

(65) Prior Publication Data

US 2022/0416474 A1 Dec. 29, 2022

(30) Foreign Application Priority Data

Dec. 2, 2019 (JP) ................................ 2019-217910

(51) Int. Cl.
*H01R 13/58* (2006.01)
*H01R 13/502* (2006.01)

(52) U.S. Cl.
CPC ..... *H01R 13/5812* (2013.01); *H01R 13/5025* (2013.01)

(58) Field of Classification Search
CPC ........................ H01R 13/5812; H01R 13/5025
See application file for complete search history.

(56) References Cited

U.S. PATENT DOCUMENTS 3,465,092 A * 9/1969 Schwartz .............. H01R 4/646 174/89
5,997,349 A 12/1999 Yoshioka
(Continued)

FOREIGN PATENT DOCUMENTS

| | | | |
|---|---|---|---|
| EP | 3457501 | A1 | 3/2019 |
| JP | 2015-018616 | A | 1/2015 |
| WO | 2019/124030 | A1 | 6/2019 |

OTHER PUBLICATIONS

International Search Report issued on Jan. 19, 2021 for WO 2021/111875 A1 (4 pages).

*Primary Examiner* — Travis S Chambers
(74) *Attorney, Agent, or Firm* — Venjuris, P.C.

(57) ABSTRACT

The present disclosure provides a connector with which it is possible to suppress an increase in the number of components. A retainer comprises a main body part having a plurality of through-holes through which a plurality of electric wires respectively pass, and a plurality of retaining parts protruding from the main body part and respectively retaining the plurality of electric wires. Each of the plurality of retaining parts has an elastic piece elastically deformable in a second direction crossing a first direction in which the retaining parts protrude. A plurality of supporting members are respectively attached to the outer peripheral surfaces of the plurality of retaining parts. The supporting members each press the elastic piece against the outer peripheral surface of the electric wire.

7 Claims, 7 Drawing Sheets

(56) References Cited

U.S. PATENT DOCUMENTS

| | | | | |
|---|---|---|---|---|
| 2005/0130487 | A1* | 6/2005 | Bartholoma | H02G 15/04 439/462 |
| 2010/0151721 | A1 | 6/2010 | Tyler | |
| 2012/0003860 | A1* | 1/2012 | Gossen | H01R 13/5812 439/460 |
| 2016/0344132 | A1 | 11/2016 | Hashiguchi | |
| 2019/0157797 | A1 | 5/2019 | McDowell et al. | |

* cited by examiner

CONNECTOR WITH SUPPORTING MEMBER PRESSING RESILIENT PIECES AGAINST THE WIRE

CROSS REFERENCE TO RELATED APPLICATIONS

This application is a national phase of PCT application No. PCT/JP2020/042946, filed on 18 Nov. 2020, which claims priority from Japanese patent application No. 2019-217910, filed on 2 Dec. 2019, all of which are incorporated herein by reference.

TECHNICAL FIELD

The present disclosure relates to a connector.

BACKGROUND

Patent Document 1 discloses a connector provided with a tension release mechanism. The connector described in Patent Document 1 includes a tubular housing into which a wire with terminal is mounted, a collet arranged on one end of the housing to hold a wire ending from the housing, and a retainer mounted on the one end of the housing to fix the collet between the housing and the retainer. A sealing member for sealing between the outer peripheral surface of the wire and the inner peripheral surface of the housing is provided in the housing.

The collet includes a plurality of finger-like portions extending along an extending direction of the wire. By attaching the retainer to the housing, a plurality of ribs formed on the inner surface of the retainer are engaged with the respective finger-like portions of the collet. In this way, the respective finger-like portions press the outer peripheral surface of the wire, thereby holding the wire. According to such a tension release mechanism, even if an external force is applied to a part pulled out to the outside of the housing, out of the wire, by holding the wire at an intermediate position in the extending direction by the collet, it can be suppressed that the above external force is applied to a part located inside the housing, out of the wire.

PRIOR ART DOCUMENT

Patent Document

Patent Document 1: JP 2012-511804 A

SUMMARY OF THE INVENTION

Problems to be Solved

If the technique described in Patent Document 1 is applied to a connector in which a plurality of wires arranged in parallel are mounted in one housing, the following inconvenience occurs. That is, since as many collets and retainers as the wires are necessary, the number of components of the connector increases.

The present disclosure aims to provide a connector capable of suppressing an increase in the number of components.

Means to Solve the Problem

The present disclosure is directed to a connector with a housing, a plurality of wires being mounted into the housing, a retainer to be attached to the housing, and a plurality of supporting members to be mounted on the retainer, wherein the retainer includes a body portion having a plurality of through holes, the plurality of wires being individually passed through the plurality of through holes, and a plurality of holding portions projecting from the body portion to individually hold the plurality of wires, each of the plurality of holding portions includes a resilient piece resiliently deformable in a second direction intersecting a first direction, the holding portion projecting in the first direction, the plurality of supporting members are individually mounted on outer peripheral surfaces of the plurality of holding portions, and the supporting member presses the resilient piece against an outer peripheral surface of the wire.

Effect of the Invention

According to the present disclosure, it is possible to suppress an increase in the number of components of a connector.

DETAILED DESCRIPTION TO EXECUTE THE INVENTION

Description of Embodiments of Present Disclosure

Figure 1:
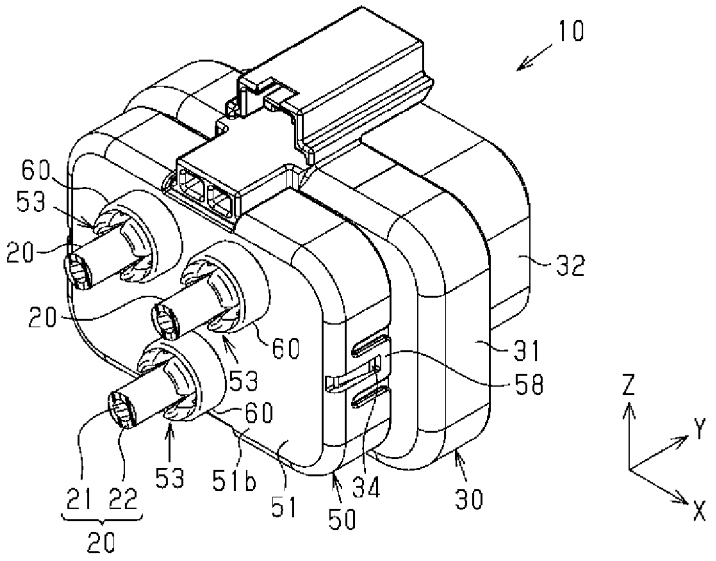
FIG. 1 is a perspective view of a connector of a first embodiment.

First, embodiments of the present disclosure are listed and described.

[1] The connector of the present disclosure is provided with a housing, a plurality of wires being mounted into the housing, a retainer to be attached to the housing, and a plurality of supporting members to be mounted on the retainer, wherein the retainer includes a body portion having a plurality of through holes, the plurality of wires being individually passed through the plurality of through holes, and a plurality of holding portions projecting from the body portion to individually hold the plurality of wires, each of the plurality of holding portions includes a resilient piece resiliently deformable in a second direction intersecting a first direction, the holding portion projecting in the first direction, the plurality of supporting members are individually mounted on outer peripheral surfaces of the plurality of holding portions, and the supporting member presses the resilient piece against an outer peripheral surface of the wire.

According to this configuration, the plurality of wires are held by the plurality of holding portions projecting from the body portion of one retainer and the plurality of supporting members. Thus, the number of the retainer can be minimized Therefore, an increase in the number of components of the connector can be suppressed.

[2] Preferably, the resilient piece includes a pressing portion projecting toward the wire in the second direction, and the pressing portion is pressed against the outer peripheral surface of the wire.

According to this configuration, the holding of the wire can be enhanced since the outer peripheral surface of the wire is pressed by the pressing portion of the resilient piece.

[3] Preferably, the resilient piece includes a restricting projection projecting away from the wire in the second direction, and the restricting projection restricts a movement of the supporting member away from the body portion in the first direction.

According to this configuration, the supporting member is restricted from moving away from the body portion in the first direction by the restricting projection of the resilient piece. In this way, the supporting member can be prevented from coming off from the holding portion. Therefore, each wire can be stably held.

[4] Preferably, the resilient pieces include a first resilient piece having the restricting projection and a second resilient piece not having the restricting projection.

In mounting the supporting member on the holding portion including the resilient piece having the restricting projection, the supporting member needs to ride over the restricting projection. Thus, if all of a plurality of the resilient pieces constituting the holding portion have the restricting projection, a friction force generated when the supporting member rides over the restricting projections increases and a mounting operation of the supporting member may become difficult.

On this point, according to the above configuration, the resilient pieces include the first resilient piece having the restricting projection and the second resilient piece not having the restricting projection. In this way, a friction force generated when the supporting member is mounted on the holding portion can be reduced as compared to the case where all of the plurality of resilient pieces are the first resilient pieces. Therefore, the mounting operation of the supporting member is facilitated.

[5] Preferably, the first resilient piece of one of two holding portions adjacent to each other and the second resilient piece of the other are adjacent to each other.

According to this configuration, an interval between center axes of the two holding portions can be reduced while an interval between two resilient pieces adjacent to each other is ensured as compared to a configuration in which the first resilient pieces of the two holding portions adjacent to each other are adjacent to each other. Therefore, an increase in the size of the retainer, consequently in the size of the connector, can be suppressed.

[6] Preferably, the second resilient piece of one of two holding portions adjacent to each other and the second resilient piece of the other are adjacent to each other.

According to this configuration, an interval between center axes of the two holding portions can be minimized while an interval between two resilient pieces adjacent to each other is ensured as compared to a configuration in which the first resilient pieces of the two holding portions adjacent to each other are adjacent to each other. Therefore, an increase in the size of the retainer, consequently in the size of the connector, can be suppressed.

[7] Preferably, the restricting projection is provided on a tip of the resilient piece, and an inclined portion inclined to be located more away from the wire in the second direction toward the tip of the resilient piece is provided on an inner surface of the resilient piece.

In mounting the supporting member on the holding portion including the resilient piece having the restricting projection, the supporting member needs to ride over the restricting projection. Here, when the supporting member rides over the restricting projection, the resilient piece is deflected toward the wire in the second direction, whereby a large load may be applied to the wire by the inner surface of the resilient piece, particularly a part of the inner surface on the back side of the restricting projection, being strongly pressed against the outer peripheral surface of the wire.

On this point, according to the above configuration, a gap is formed between the inner surface of the resilient piece and the outer peripheral surface of the wire by the inclined portion provided on the inner surface of the resilient piece. Thus, it can be suppressed that the inner surface of the resilient piece is strongly pressed against the outer peripheral surface of the wire when the resilient piece is deflected toward the wire in the second direction. Therefore, it can be suppressed that a large load is applied to the wire.

Details of Embodiment of Present Disclosure

Specific examples of a connector of the present disclosure are described below with reference to the drawings. In each figure, some of components may be shown in an exaggerated or simplified manner for the convenience of description. Further, a dimension ratio of each part may be different in each figure. Note that the present disclosure is not limited to these illustrations and is intended to be represented by claims and include all changes in the scope of claims and in the meaning and scope of equivalents. "Orthogonal" in this specification means not only strictly orthogonal, but also substantially orthogonal within a range in which functions and effects in embodiments are achieved.

First Embodiment

A connector of a first embodiment is described below.

<Overall Configuration of Connector 10>

Figure 2:
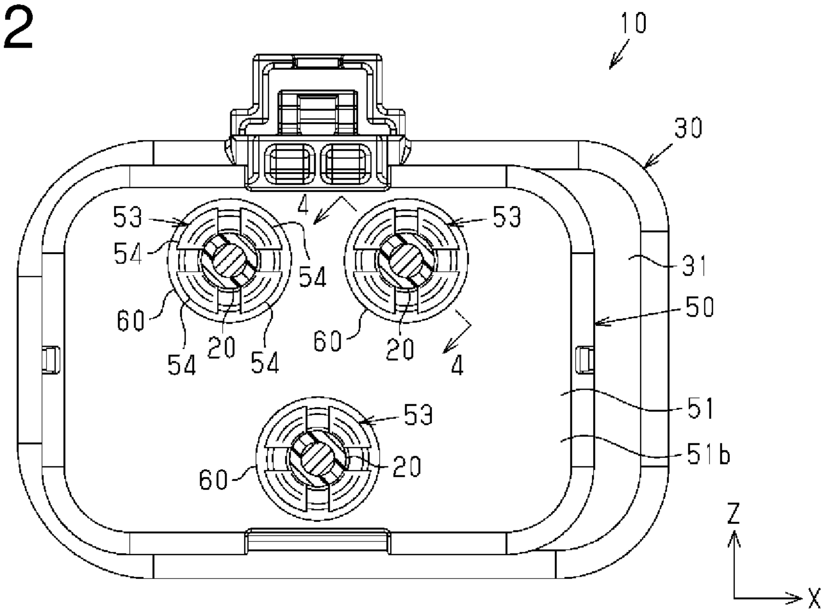
FIG. 2 is a front view of the connector of the first embodiment.

As shown in FIGS. 1 and 2, a connector 10 includes a housing 30 in which a plurality of wires 20 arranged in parallel are mounted, a plurality of sealing members 40 (see FIG. 4) for sealing between the outer peripheral surface of each wire 20 and the inner peripheral surface of the housing 30, and a retainer 50 for retaining the sealing members 40 by being attached to the housing 30. A plurality of supporting members 60 are mounted on the retainer 50.

The connector 10 can be used in an arbitrary posture, but the configuration of the connector 10 is described with an extending direction of the wires 20 set as a front-rear direction in this embodiment. Note that, out of XYZ axes in each figure, the X axis represents a width direction of the connector 10, the Y axis represents the front-rear direction of the connector 10 orthogonal to the X axis, and the Z axis represents a vertical direction of the connector 10 orthogonal to both the X axis and the Y axis. In the following description, a direction extending along the X axis is referred to as a width direction X, a direction extending along the Y axis is referred to as a front-rear direction Y and a direction along the Z axis is referred to as a vertical direction Z for the sake of convenience. Further, in the following description, a direction of an arrow Z in FIG. 1 is an upward direction and an opposite direction is a downward direction. Further, a direction of an arrow Y is a forward direction and an opposite direction is a rearward direction.

Two wires 20 extending in parallel in the width direction X in an upper part of the housing 30 and one wire 30 extending in a part of the housing 30 below the former wires 20 are mounted in the housing 30 of this embodiment. The above one wire 20 is located between the above two wires 20 in the width direction X.

<Configuration of Wires 20>

As shown in FIG. 1, each wire 20 includes a conductive core 21 and an insulation coating 22 made of resin for covering the outer periphery of the core 21. An unillustrated metal terminal to be accommodated into the housing 30 is provided on the tip of the core 21 exposed from the insulation coating 22 in each wire 20.

<Configuration of Housing 30>

Figure 3:
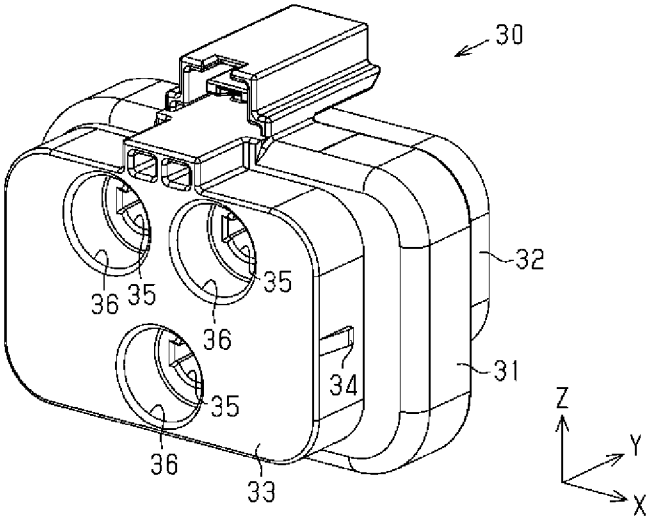
FIG. 3 is a perspective view of a housing of the first embodiment.

As shown in FIG. 3, the housing 30 includes a body portion 31 having a rectangular parallelepiped shape long in the width direction X, a fitting portion 32 projecting forward from the body portion 31 and to be fit to an unillustrated mating connector, and a mounting portion 33 projecting rearward from the body portion 31 and configured such that the retainer 50 is attached thereto. Outside dimensions of the mounting portion 33 and those of the fitting portion 32 are one size smaller than those of the body portion 31.

A pair of locking projections 34 for locking the retainer 50 are provided on both sides in the width direction X of the mounting portion 33.

The housing 30 is provided with three through holes 35, which penetrate through the body portion 31 and the fitting portion 32 and through which the respective wires 20 are mounted. An axial direction of each through hole 35 coincides with the front-rear direction Y.

The mounting portion 33 is provided with three accommodation holes 36 having a larger diameter than the through holes 35 and communicating with the through holes 35.

<Configuration of Sealing Members 40>

Figure 4:
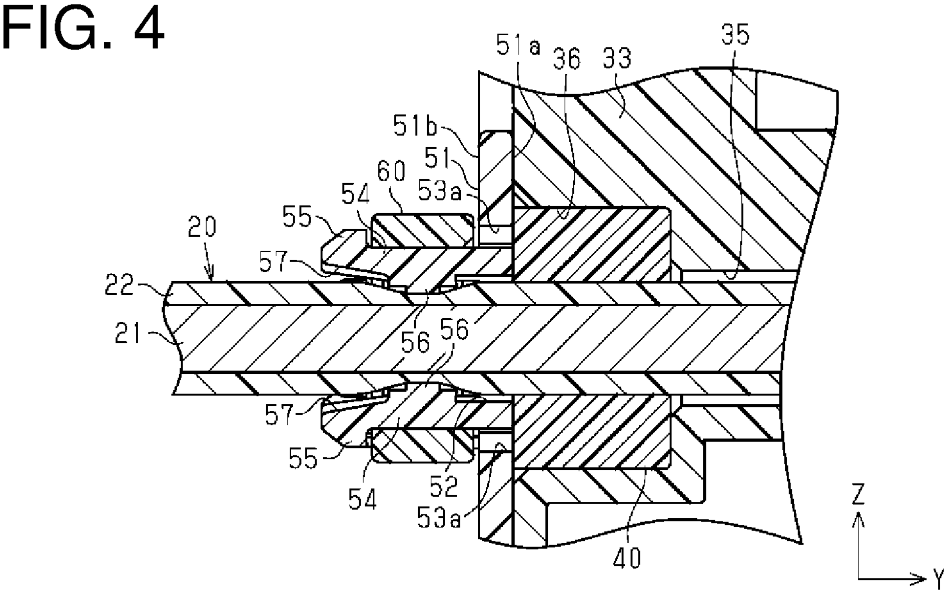
FIG. 4 is a section along 4-4 of FIG. 2.

As shown in FIG. 4, each sealing member 40 is accommodated in each accommodation hole 36. The sealing member 40 has an annular shape. Each wire 20 is passed through each sealing member 40, whereby sealing is provided between the outer peripheral surface of each wire 20 and the inner peripheral surface of the accommodation hole 36.

<Configuration of Retainer 50>

Figure 5:
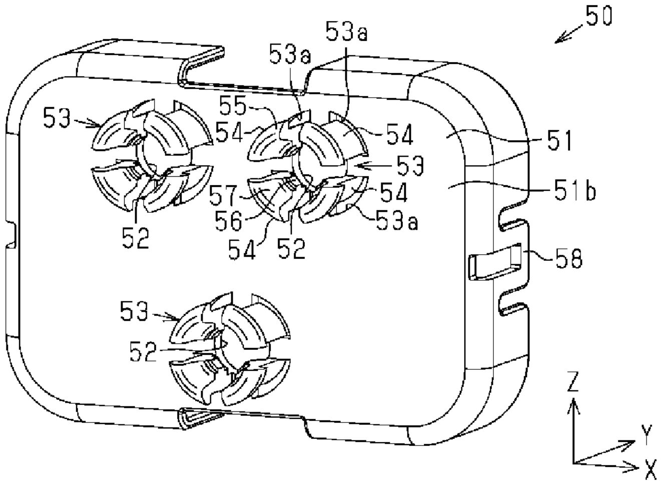
FIG. 5 is a perspective view of a retainer of the first embodiment.
Figure 6:
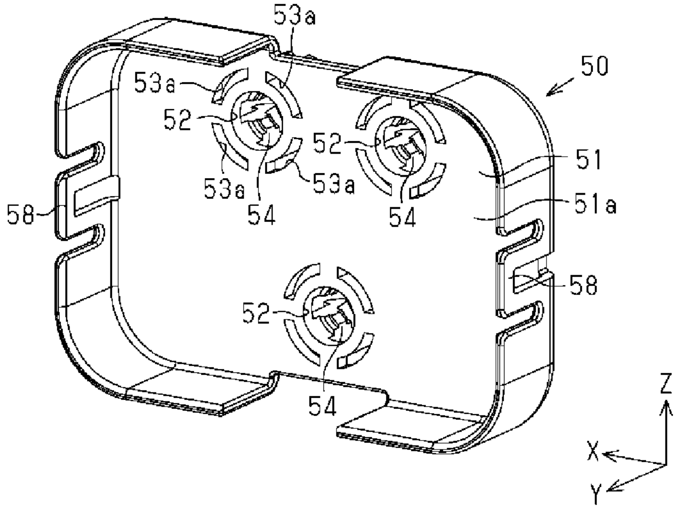
FIG. 6 is a perspective view of the retainer of the first embodiment.

As shown in FIGS. 5 and 6, the retainer 50 includes a body portion 51 having a plurality of through holes 52, through which the plurality of wires 20 are individually passed, and a plurality of holding portions 53 projecting in a first direction from the body portion 51 to individually hold the plurality of wires 20. The body portion 51 has a first surface **51*a* facing the mounting portion 33 of the housing 30, and a second surface 51*b* opposite to the first surface 51*a*. The first and second surfaces 51*a*, 51*b* are orthogonal to the front-rear direction Y. Each through hole 52 penetrates through the first and second surfaces 51*a*, 51*b*. Each holding portion 53 projects from the second surface 51*b*. In this embodiment, the first direction in which the holding portions 53** project coincides with the front-rear direction Y.

The retainer 50 of this embodiment is provided with three through holes 52 and three holding portions 53. An axial direction of each through hole 52 coincides with the front-rear direction Y.

A circumferential direction of the through hole 52 is merely referred to as a circumferential direction and a radial direction of the through hole 52 is merely referred to as a radial direction below.

As shown in FIG. 2, when the retainer 50 is viewed from behind, center axes of the three holding portions 53 are located on vertices of a triangle. The arrangement of such three holding portions 53 is referred to as a triangular arrangement below. Note that the center axis of each holding portion 53 coincides with a center axis of each through hole 52.

As shown in FIGS. 5 and 6, a pair of locking portions 58 to be locked to the respective locking projections 34 on the mounting portion 33 of the housing 30 are provided on both sides in the width direction X of the body portion 51. The respective locking projections 34 and the respective locking portions 58 are locked to each other, whereby the retainer 50 is attached to the housing 30.

Each holding portion 53 includes a plurality of resilient pieces 54 projecting rearward from the body portion 51 and resiliently deformable in a second direction intersecting the first direction. Each holding portion 53 of this embodiment includes four resilient pieces 54 provided at intervals of 90° in the circumferential direction. Each resilient piece 54 has an arcuate cross-sectional shape orthogonal to the front-rear direction Y. The second direction in this embodiment is a direction orthogonal to the first direction, i.e. the front-rear direction Y.

Each resilient piece 54 projects rearward from an edge part of the through hole 52. The inner surface of each resilient piece 54 is flush with that of the through hole 52.

The outer surfaces of the respective resilient pieces 54 in one holding portion 53 are located on the same circumference centered on the center axis of the through hole 52.

A through hole **53*a* penetrating through the body portion 51 in the front-rear direction Y is provided adjacent to the resilient piece 54 in a part radially outward of the base end of each resilient piece 54 in the body portion 51. The through hole 53*a* has an arcuate cross-sectional shape along the outer surface of the resilient piece 54. Thus, the resilient piece 54 is coupled to the body portion 51 on both end parts in the circumferential direction. In this way, the resilient piece 54** is easily deflected radially inward.

As shown in FIGS. 4 and 5, a restricting projection 55 projecting away from the wire 20 in the second direction is provided on the tip of the resilient piece 54. The outer surface of a rear side of the restricting projection 55 is inclined radially outward toward the front.

A pressing portion 56 projecting toward the wire 20 in the second direction is provided in a center part in the front-rear direction Y of the inner surface of the resilient piece 54. The pressing portion 56 is pressed against the outer peripheral surface of the wire 20. The pressing portion 56 has such a step shape that a projecting amount increases stepwise from both sides in the front-rear direction Y. Note that the inner surface of the pressing portion 56 is arcuately curved to extend along the outer peripheral surface of the wire 20 in the circumferential direction.

An inclined portion 57 inclined to be located more away from the wire 20 in the second direction toward the tip of the resilient piece 54 is provided in a part on the back side of the restricting projection 55, out of the inner surface of the resilient piece 54.

<Configuration of Supporting Members 60>

As shown in FIGS. 1, 2 and 4, the plurality of supporting members 60 are individually mounted on the outer peripheral surfaces of the plurality of holding portions 53 of the retainer 50. In this embodiment, one supporting member 60 is mounted on each holding portion 53.

The supporting member 60 has an annular shape. The supporting member 60 is made of resin.

The outer peripheral surface of the supporting member 60 is located radially outward of the outer surfaces of the restricting projections 55 of the resilient pieces 54. The supporting member 60 presses the resilient pieces 54 against the outer peripheral surface of the wire 20. The supporting member 60 is restricted from moving away from the body portion 51 in the first direction by the restricting projections 55.

A function of this embodiment is described.

In the connector 10, the three wires 20 are held by the three holding portions 53 projecting from the body portion 51 of one retainer 50 and the three supporting members 60. Thus, the number of the retainer 50 can be minimized.

Effects of this embodiment are described.

(1) The retainer 50 includes the body portion 51 having the plurality of through holes 52 through which the plurality of wires 20 are individually passed, and the plurality of holding portions 53 projecting from the body portion 51 to individually hold the plurality of wires 20. Each of the plurality of holding portions 53 includes the resilient pieces 54 resiliently deformable in the second direction intersecting the first direction in which the holding portion 53 projects. The plurality of supporting members 60 are individually mounted on the outer peripheral surfaces of the plurality of holding portions 53. The supporting member 60 presses the resilient pieces 54 against the outer peripheral surface of the wire 20.

According to this configuration, an increase in the number of components of the connector 10 can be suppressed since the above function is achieved.

(2) The resilient piece 54 includes the pressing portion 56 projecting toward the wire 20 in the second direction. The pressing portion 56 is pressed against the outer peripheral surface of the wire 20.

According to this configuration, the holding of the wire 20 can be enhanced since the outer peripheral surface of the wire 20 is pressed by the pressing portions 56 of the resilient pieces 54.

(3) The resilient piece 54 includes the restricting projection 55 projecting away from the wire 20 in the second direction. The restricting projection 55 restricts a movement of the supporting member 60 away from the body portion 51 in the first direction.

According to this configuration, the supporting member 60 is restricted from moving away from the body portion 51 in the first direction by the restricting projections 55 of the resilient pieces 54. In this way, the supporting member 60 can be prevented from coming off from the holding portion 53. Therefore, each wire 20 can be stably held.

(4) The restricting projection 55 is provided on the tip of the resilient piece 54, and the inclined portion 57 inclined to be located more away from the wire 20 in the second direction toward the tip of the resilient piece 54 is provided on the inner surface of the resilient piece 54.

In mounting the supporting member 60 on the holding portion 53 including the resilient pieces 54 having the restricting projection 55, the supporting member 60 needs to ride over the restricting projections 55. Here, when the supporting member 60 rides over the restricting projections 55, the resilient pieces 54 are deflected toward the wire 20 in the second direction, whereby a large load may be applied to the wire 20 by the inner surfaces of the resilient pieces 54, particularly the parts of the inner surfaces on the back sides of the restricting projections 55, being strongly pressed against the outer peripheral surface of the wire 20.

On this point, according to this embodiment, gaps are formed between the inner surfaces of the resilient pieces 54 and the outer peripheral surface of the wire 20 by the inclined portions 57 provided on the inner surfaces of the resilient pieces 54. Thus, it can be suppressed that the inner surfaces of the resilient pieces 54 are strongly pressed against the outer peripheral surface of the wire 20 when the resilient pieces 54 are deflected toward the wire in the second direction. Therefore, it can be suppressed that a large load is applied to the wire 20.

Second Embodiment

Points of difference from the first embodiment are mainly described for a connector of a second embodiment below.

Note that, in this embodiment, repeated description is omitted by denoting the same components as those of the first embodiment by the same reference signs and denoting components corresponding to those of the first embodiment by reference signs "1" obtained by adding "100" to the reference signs "" of the first embodiment.

<Overall Configuration of Connector 110>

Figure 7:
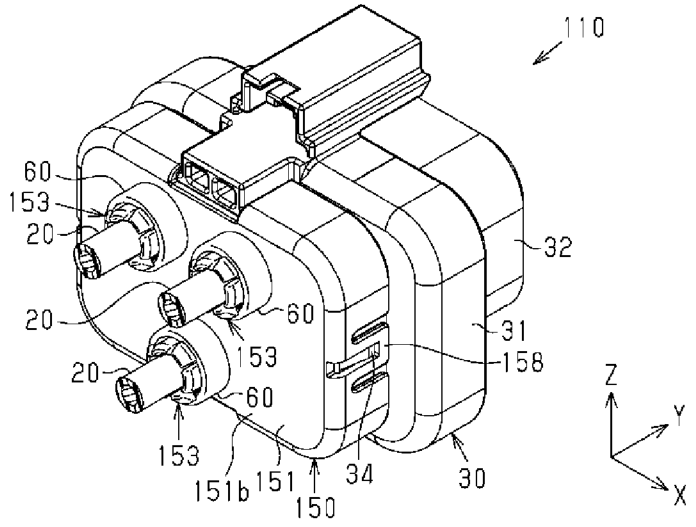
FIG. 7 is a perspective view of a connector of a second embodiment.
Figure 8:
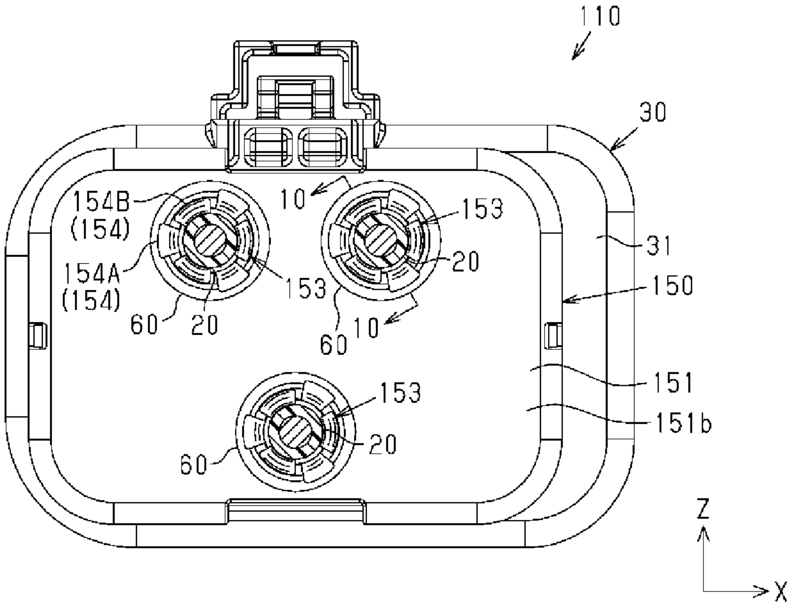
FIG. 8 is a front view of the connector of the second embodiment.

As shown in FIGS. 7 and 8, a connector 110 includes a housing 30 in which three wires 20 arranged in parallel are mounted, and a retainer 150 to be attached to the housing 30.

In the connector 110 of the second embodiment, the shape of the retainer 150 is different from that of the retainer 50 of the connector 10 in the first embodiment.

<Configuration of Retainer 150>

Figure 9:
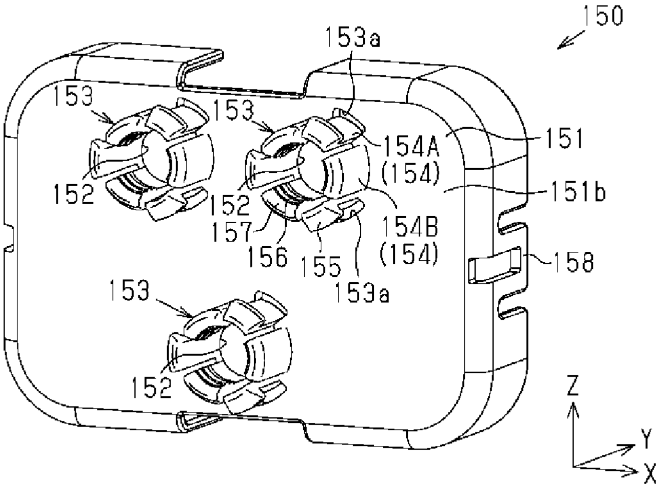
FIG. 9 is a perspective view of a retainer of the second embodiment.

As shown in FIG. 9, the retainer 150 includes a body portion 151 having a plurality of through holes 152, through which the plurality of wires 20 are individually passed, and a plurality of holding portions 153 projecting in a first direction from the body portion 151 to hold the plurality of wires 20. The retainer 150 of this embodiment is provided with three through holes 152 and three holding portions 153. The three holding portions 153 are in a triangular arrangement.

Each holding portion 153 includes a plurality of resilient pieces 154 spaced apart from each other in a circumferential direction. The plurality of resilient pieces 154 constituting the holding portion 153 include a plurality of first resilient pieces 154A having a restricting projection 155 and a plurality of second resilient pieces 154B not having the restricting projection 155. Each second resilient piece 154B includes a pressing portion 156 projecting toward the wire 20 in a second direction. The pressing portion 156 is pressed against the outer peripheral surface of the wire 20. In this embodiment, the first resilient pieces 154A and the second resilient pieces 154B are alternately provided in the circumferential direction. Each holding portion 153 in this embodiment includes three resilient pieces 154A and three second resilient pieces 154B.

As shown in FIG. 8, the first resilient piece 154A of one of two holding portions 153 adjacent to each other and the second resilient piece 154B of the other are adjacent to each other.

Each resilient piece 154A, 154B has an arcuate cross-sectional shape orthogonal to a front-rear direction Y.

As shown in FIG. 9, each resilient piece 154A, 154B projects rearward from an edge part of the through hole 152. The inner surface of each resilient piece 154A, 154B is flush with the inner surface of the through hole 152.

The outer surfaces of the respective first resilient pieces 154 and those of the respective second resilient pieces 154B in one holding portion 153 are located on the same circumference centered on an axis of the through hole 152.

A through hole 153*a* penetrating through the body portion 151 in the front-rear direction Y is provided adjacent to the first resilient piece 154A in a part radially outward of the base end of each first resilient piece 154A in the body portion 151. The through hole 153*a* has an arcuate cross-sectional shape along the outer surface of the first resilient piece 154A. Thus, the first resilient piece 154A is coupled to the body portion 151 on both end parts in the circumferential direction. In this way, the first resilient piece 154A is easily deflected radially inward.

Figure 10:
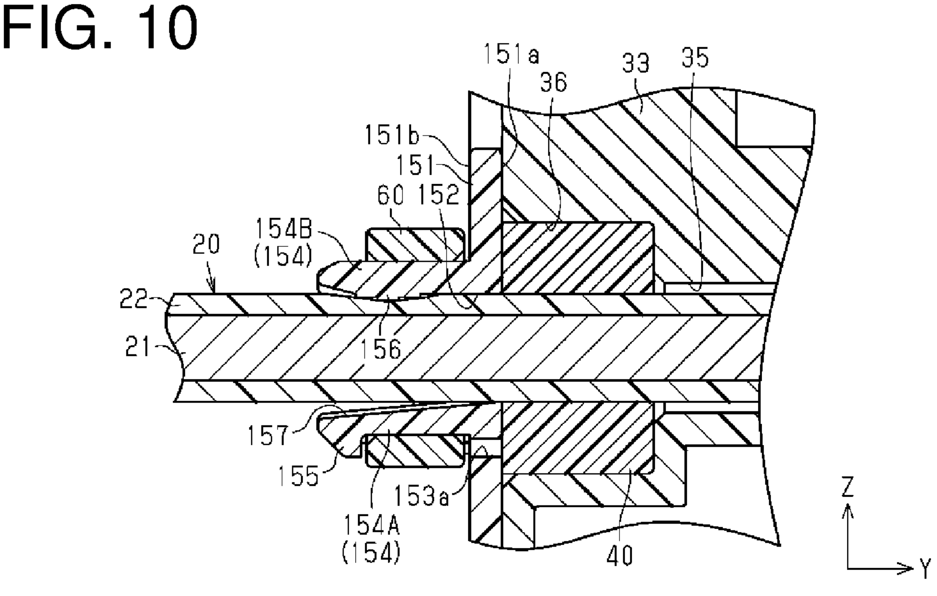
FIG. 10 is a section along 10-10 of FIG. 8.

As shown in FIG. 10, an inclined portion 157 inclined to be located more away from the wire 20 in the second direction toward the tip of the first resilient piece 154A is provided on the inner surface of the resilient piece 154A. The inclined portion 157 is provided over the entire first resilient piece 154A in the front-rear direction Y.

A function of this embodiment is described.

In mounting the supporting member 60 on the holding portion 153 including the resilient pieces 154 having the restricting projection 155, the supporting member 60 needs to ride over the restricting projections 155. Thus, if all of the plurality of resilient pieces 154 constituting the holding portion 153 have the restricting projection 155, a friction force generated when the supporting member 60 rides over the restricting projections 155 increases and a mounting operation of the supporting member 60 may become difficult.

On this point, according to the connector 110 of this embodiment, the plurality of resilient pieces 154 constituting the holding portion 153 include the first resilient pieces 154A having the restricting projection 155 and the second resilient pieces 154B not having the restricting projection 155. In this way, a friction force generated when the supporting member 60 is mounted on the holding portion 153 can be reduced as compared to the case where all of the plurality of resilient pieces 154 are the first resilient pieces 154A.

Effects of this embodiment are described.

According to the connector 110 of this embodiment, the following effects are newly obtained in addition to the effects (1) to (4) of the first embodiment.

(5) The resilient pieces 154 include the first resilient pieces 154A having the restricting projection 155 and the second resilient pieces 154B not having the restricting projection 155.

According to this configuration, the mounting operation of the supporting member 60 is facilitated since the above effect is achieved.

(6) The first resilient piece 154A of one of two holding portions 153 adjacent to each other and the second resilient piece 154B of the other are adjacent to each other.

According to this configuration, an interval between center axes of the two holding portions 153 can be reduced while an interval between the two resilient pieces 154 adjacent to each other is ensured as compared to a configuration in which the first resilient pieces 154A of the two holding portions 153 adjacent to each other are adjacent to each other. Therefore, an increase in the size of the retainer 150, consequently in the size of the connector 110, can be suppressed.

<Modifications>

The above embodiments can be modified and carried out as follows. The above embodiments and the following modifications can be carried out in combination without technically contradicting each other.

Note that, in the following first modification, second modification and third modification respectively shown in FIGS. 11, 12 and 13, repeated description is omitted by denoting the same components as those of the second embodiment by the same reference signs and denoting components corresponding to those of the second embodiment by reference signs "2", "3" and "4" obtained by adding "100", "200" and "300" to the reference signs "1" of the second embodiment.

Figure 11:
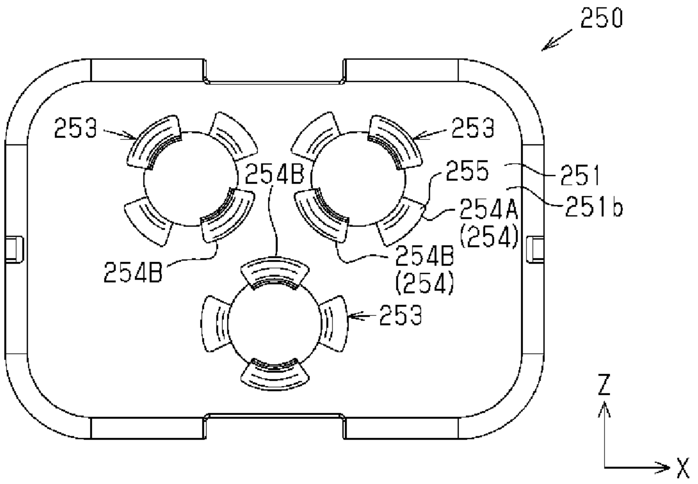
FIG. 11 is a front view of a retainer of a first modification.

As shown in FIG. 11, in three holding portions 253 in a triangular arrangement, a second resilient piece 254B of one of two holding portions 253 adjacent to each other and a second resilient piece 254B of the other may be adjacent to each other. According to this configuration, a distance between the resilient pieces 254 can be reduced as compared to a triangular arrangement in which first resilient pieces 254A are arranged adjacent to each other. Thus, an interval between center axes of the two holding portions 253 can be minimized while an interval between the two resilient pieces 254 adjacent to each other is ensured. Therefore, an increase in the size of a retainer 250, consequently in the size of a connector, can be suppressed.

Figure 12:
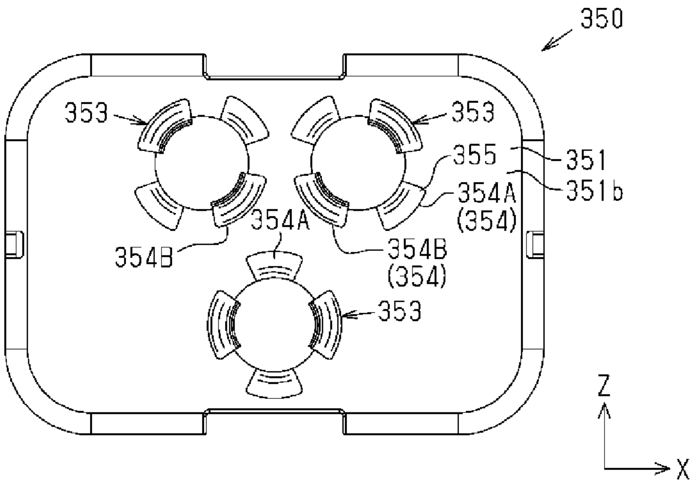
FIG. 12 is a front view of a retainer of a second modification.

As shown in FIG. 12, holding portions 353 may be so arranged that a first resilient piece 354A of one holding portion 353 located below in a triangular arrangement and second resilient pieces 354B of two holding portions 353 located above are adjacent to each other. Even in this case, an interval between center axes of the two holding portions 353 can be reduced while an interval between two resilient pieces 354 adjacent to each other is ensured as compared to a triangular arrangement in which the first resilient pieces 354A are arranged adjacent to each other. Therefore, an increase in the size of a retainer 350, consequently in the size of a connector, can be suppressed.

Figure 13:
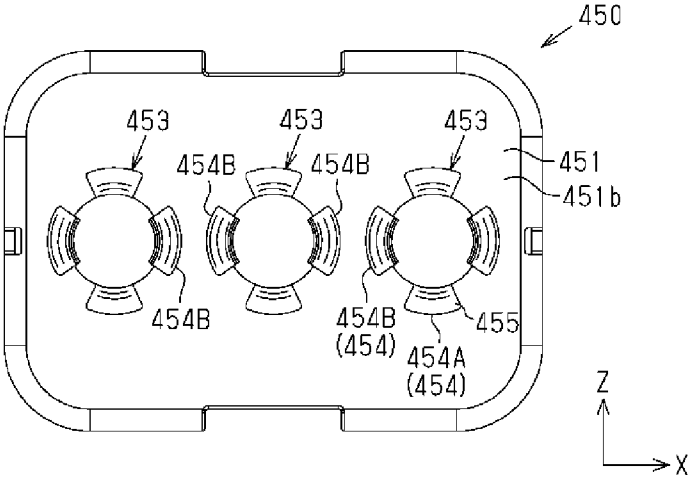
FIG. 13 is a front view of a retainer of a third modification.

As shown in FIG. 13, three holding portions 453 may be arranged side by side in a row in the width direction X. In this case, as shown in FIG. 13, the respective holding portions 453 may be so arranged that second resilient pieces 454B of the respective holding portions 453 are adjacent to each other in an arrangement direction of the respective holding portions 453. Further, the respective holding portions 453 may be so arranged that a first resilient piece 454A of one holding portion 453 and the second resilient piece 454B of another holding portion 453 are adjacent to each other in the arrangement direction.

The first resilient piece 154A of one of the two holding portions 153 adjacent to each other and the first resilient piece 154A of the other may be adjacent to each other.

The inclined portions 57, 157 may be omitted.

The first resilient pieces 154A may be omitted. That is, the holding portion 153 may include only the second resilient pieces 154B.

The pressing portions 56, 156 may be omitted and the outer peripheral surface of the wire 20 may be pressed by the entire inner surfaces of the resilient pieces 54, 154.

The restricting projection 55, 155 may be provided on a side closer to the base end than the tip of the resilient piece 54, 154.

The restricting projections 55, 155 may be omitted.

The number of the wires 20 to be mounted into the connector 10, 110 may be two, four or more. In this case, the retainer 50, 150 including a plurality of holding portions 53, 153 corresponding to the number of the wires 20 may be prepared.

The supporting member 60 is not limited to the one made of resin, and may be, for example, made of metal.

Although the second direction is a direction orthogonal to the first direction in the above embodiments, there is no limitation to this and the second direction may be a direction intersecting the first direction at an arbitrary angle.

The present disclosure includes the following implementation examples. Reference numerals of several constituent elements of illustrative embodiments are given not for limitation, but for understanding assistance. Matters described in the following implementation examples may be partly omitted or several of the matters described in the implementation examples may be selected or extracted and combined.

[Addendum 1] A connector (10, 110) according to one or more implementation examples of the present disclosure is provided with:

a housing (30) into which a plurality of wires (20) are mounted;

a retainer (50, 150, 250, 350, 450) to be attached to the housing and including a body portion (51, 151, 251, 351, 451) having a first surface (51*a*) facing the housing, a second surface (51*b*) on a side opposite to the first surface and a plurality of through holes (35) extending from the first surface to the second surface, the plurality of wires being individually passed through the plurality of through holes, the second surface having a plurality of opening edge parts defining openings of the plurality of through holes, and a plurality of holding portions (53, 153, 253, 353, 453) provided on the second surface of the body portion to individually hold the plurality of wires, each of the plurality of holding portions having a plurality of resiliently deformable resilient pieces (54, 154, 254, 354, 454) projecting from the corresponding opening edge part on the second surface of the body portion; and a plurality of supporting members (60) for individually supporting the plurality of holding portions, each of the plurality of supporting members (60) being mounted on outer peripheral surfaces (56) of the plurality of resilient pieces of the corresponding holding portion to press the plurality of resilient pieces against the outer peripheral surface of the corresponding wire.

[Addendum 2] In several implementation examples of the present disclosure, the plurality of resilient pieces of each of the plurality of holding portions may be arranged around the corresponding opening along the corresponding opening edge part of the second surface of the body portion, and the adjacent resilient pieces may be arranged at a distance from each other.

[Addendum 3] In several implementation examples of the present disclosure, each of the plurality of resilient pieces may have a holding surface (56) facing the corresponding wire and an outer peripheral surface on a side opposite to the holding surface.

[Addendum 4] In several implementation examples of the present disclosure, each of the plurality of resilient pieces may include a pressing portion (56) projecting from the holding surface (56).

[Addendum 5] In several implementation examples of the present disclosure, the pressing portion (56) of each of the plurality of resilient pieces may be located at an intermediate position between a base end and a tip of the resilient piece.

[Addendum 6] In several implementation examples of the present disclosure, each of the plurality of resilient pieces may include a restricting projection (55) projecting from the outer peripheral surface of the tip of the resilient piece.

[Addendum 7] In several implementation examples of the present disclosure, the plurality of resilient pieces of each of the plurality of holding portions may include first resilient pieces (154A) having the restricting projection and second resilient pieces (154B) not having the restricting projection.

[Addendum 8] In several implementation examples of the present disclosure, the first resilient pieces (154A) and the second resilient pieces (154B) may alternately arranged along the corresponding opening edge part of the second surface of the body portion.

[Addendum 9] In several implementation examples of the present disclosure, the plurality of supporting members may have an annular shape, and the inner peripheral surface of each of the plurality of supporting members may contact the outer peripheral surfaces of the plurality of resilient pieces of the corresponding holding portion.

LIST OF REFERENCE NUMERALS

X width direction
Y front-rear direction
Z vertical direction
10 connector
20 wire
21 core
22 insulation coating
30 housing
31 body portion
32 fitting portion
33 mounting portion
34 locking projection
35 through hole
36 accommodation hole
40 sealing member
50 retainer
51*a* first surface
51*b* second surface
51 body portion
52 through hole
53 holding portion
53*a* through hole
54 resilient piece
55 restricting projection
56 pressing portion
57 inclined portion
58 locking portion
60 supporting member
110 connector
150 retainer
151 body portion
151*a* first surface
151*b* second surface
152 through hole
153 holding portion
153*a* through hole
154 resilient piece
154A first resilient piece
154B second resilient piece
155 restricting projection
156 pressing portion
157 inclined portion
158 locking portion
250 retainer

251 body portion
251*b* second surface
253 holding portion
254 resilient piece
254A first resilient piece
254B second resilient piece
255 restricting projection
350 retainer
351 body portion
351*b* second surface
353 holding portion
354 resilient piece
354A first resilient piece
354B second resilient piece
355 restricting projection
450 retainer
451 body portion
451*b* second surface
453 holding portion
454 resilient piece
454A first resilient piece
454B second resilient piece
455 restricting projection

What is claimed is:

1. A connector, comprising:

a housing, a plurality of wires being mounted into the housing;

a retainer to be attached to the housing; and a plurality of supporting members to be mounted on the retainer, wherein:

the retainer includes a body portion having a plurality of through holes, the plurality of wires being individually passed through the plurality of through holes, and a plurality of holding portions projecting from the body portion to individually hold the plurality of wires, each of the plurality of holding portions includes a resilient piece resiliently deformable in a second direction intersecting a first direction, the holding portion projecting in the first direction, the plurality of supporting members are individually mounted on outer peripheral surfaces of the plurality of holding portions, and the supporting member presses the resilient piece against an outer peripheral surface of the wire.

2. The connector according to claim 1, wherein:

the resilient piece includes a pressing portion projecting toward the wire in the second direction, and the pressing portion is pressed against the outer peripheral surface of the wire.

3. The connector according to claim 1, wherein:

the resilient piece includes a restricting projection projecting away from the wire in the second direction, and the restricting projection restricts a movement of the supporting member away from the body portion in the first direction.

4. The connector according to claim 3, wherein the resilient pieces include:

a first resilient piece having the restricting projection; and a second resilient piece not having the restricting projection.

5. The connector according to claim 4, wherein the first resilient piece of one of two holding portions adjacent to each other and the second resilient piece of the other are adjacent to each other.

6. The connector according to claim 4, wherein the second resilient piece of one of two holding portions adjacent to each other and the second resilient piece of the other are adjacent to each other.

7. The connector according to claim 3, wherein:

the restricting projection is provided on a tip of the resilient piece, and an inclined portion inclined to be located more away from the wire in the second direction toward the tip of the resilient piece is provided on an inner surface of the resilient piece.

* * * * *